United States Patent [19]

Kanoshima

[11] Patent Number: 5,121,257
[45] Date of Patent: Jun. 9, 1992

[54] LENS FOR READING ORIGINAL
[75] Inventor: Yuichiro Kanoshima, Tokyo, Japan
[73] Assignee: Ricoh Company, Ltd., Tokyo, Japan
[21] Appl. No.: 686,991
[22] Filed: Apr. 18, 1991
[30] Foreign Application Priority Data Jun. 22, 1990 [JP] Japan ................... 2-165448

[51] Int. Cl.$^5$ ............................................. G02B 9/34
[52] U.S. Cl. ................................. 359/772; 359/771
[58] Field of Search ................ 350/469; 359/771, 772

[56] References Cited
U.S. PATENT DOCUMENTS

| | | | |
|---|---|---|---|
| 3,941,457 | 3/1976 | Kawakami | 350/469 |
| 4,319,810 | 3/1982 | Mori | 350/469 |
| 4,560,243 | 12/1985 | Terasawa | 350/469 |
| 4,784,480 | 11/1988 | Yokota et al. | 350/469 X |

Primary Examiner—Scott J. Sugarman
Attorney, Agent, or Firm—Fish & Richardson

[57] ABSTRACT

A lens for reading an original at a reduced magnification has first to fourth lens groups sequentially arranged from an object side toward an image side, and a diaphragm arranged between the second and third lens groups. The first lens group is constructed by a joining lens having a positive focal length and is composed of positive and negative lenses. The second lens group is constructed by a joining lens having a positive focal length and is composed of a negative meniscus lens having a convex face on the object side and a positive meniscus lens having a convex face on the object side. The third lens group is constructed by a positive meniscus lens having a concave face on the object side. The fourth lens group is constructed by a joining lens composed of negative and positive lenses. A partial dispersion ratio $\theta_{gF}$ defined as $(n_g - n_F)/(n_F - n_C)$ using refractive indexes $n_g$, $n_F$ and $n_C$ of a lens material with respect to lines g, F and C, and an Abbe number $\nu_e$ with respect to a line e satisfy the following conditions, $$\nu_c > 65 \tag{1-I}$$

$$\theta_{gF} < 0.004 \tag{1-II}$$

with respect to the positive meniscus lenses of the second and third lens groups.

2 Claims, 7 Drawing Sheets

Fig. 1

LENS FOR READING ORIGINAL

BACKGROUND OF THE INVENTION

1. Field of the Invention

The present invention relates to a lens for reading an original and effectively utilized to especially read a color original.

2. Description of the Related Art

In a general digital color copying machine, etc., a color original is read by decomposing a color thereof into three primary colors composed of red, green and blue.

In such a reading operation of the color original, there is a known method for reading an original image of each of the decomposed colors on the same plane.

In this method, for example, a solid-state image sensor is arranged such that a position of this sensor is in conformity with an image forming face formed by a lens for reading the color original. Filters for color decomposition are switched between the original reading lens and the solid-state image sensor.

Recently, a solid-state image sensor for only a color image has been practically used. This sensor has three lines of light-receiving elements and also has red, green and blue filters arranged every line. The original image of each of the decomposed colors is simultaneously read on the same plane by using this solid-state image sensor.

As mentioned above, when the original image of each of the decomposed colors with respect to the color original is read on the same plane, it is necessary to construct the lens for reading the original such that best focusing faces with respect to the red, green and blue light colors are effectively in conformity with each other.

In general, there is no known lens for reading an original constructed such that the best focusing faces with respect to the red, green and blue light colors are effectively in conformity with each other when this lens is used at a reduced magnification.

SUMMARY OF THE INVENTION

It is therefore an object of the present invention to provide a lens for reading an original in which chromatic aberration on an optical axis of the original reading lens is restricted and best focusing faces with respect to red, green and blue light colors are preferably in conformity with each other.

The above object of the present invention can be achieved by a lens for reading an original at a reduced magnification comprising first to fourth lens groups sequentially arranged from an object side toward an image side; and a diaphragm arranged between the second and third lens groups, the first lens group being constructed by a joining lens having a positive focal length and composed of positive and negative lenses; the second lens group being constructed by a joining lens having a positive focal length and composed of a negative meniscus lens having a convex face on the object side and a positive meniscus lens having a convex face on the object side; the third lens group being constructed by a positive meniscus lens having a concave face on the object side; the fourth lens group being constructed by a joining lens composed of negative and positive lenses; and a partial dispersion ratio $\theta_{gF}$ defined as $(n_g - n_F)/(n_F - n_C)$ using refractive indexes $n_g$, $n_F$ and $n_C$ of a lens material with respect to lines g, F and C, and an Abbe number $\nu_e$ with respect to a line e satisfy the following conditions, $$\nu_e > 65 \quad (1\text{-}I)$$

$$\theta_{gF} < 0.004 \quad (1\text{-}II)$$

with respect to the positive meniscus lenses of the second and third lens groups.

In accordance with the above lens structure, chromatic aberration on an optical axis of the original reading lens is restricted and best focusing faces with respect to red, green and blue light colors are preferably in conformity with each other.

Further objects and advantages of the present invention will be apparent from the following description of the preferred embodiments of the present invention as illustrated in the accompanying drawings.

BRIEF DESCRIPTION OF THE DRAWINGS

FIGS. 2a, 2b, 2c, 2d to 7a, 7b, 7c, 7d are diagrams of spherical aberration, astigmatism, distortion aberration and comatic aberration with respect to respective concrete Embodiments of the present invention.

DESCRIPTION OF THE PREFERRED EMBODIMENTS

The preferred embodiments of a lens for reading an original in the present invention will next be described in detail with reference to the accompanying drawings.

A lens for reading an original in the present invention is constructed by a lens for reading an original, especially, a color original at a reduced magnification.

Figure 1:
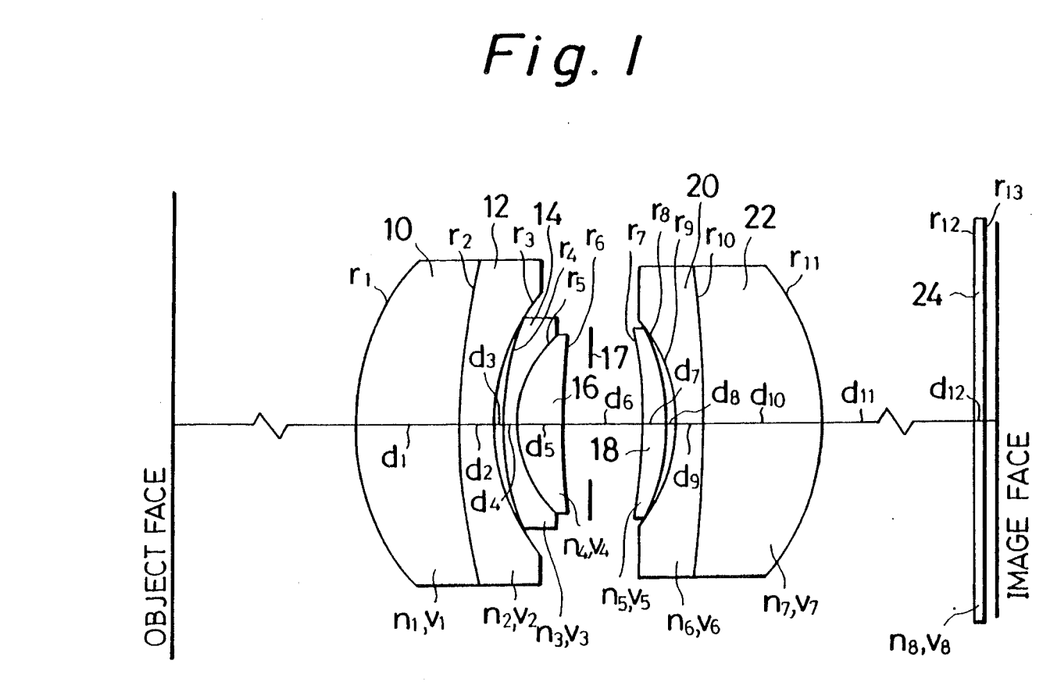
FIG. 1 is a view for explaining the construction of a lens for reading an original in the present invention.
Figure 2A:
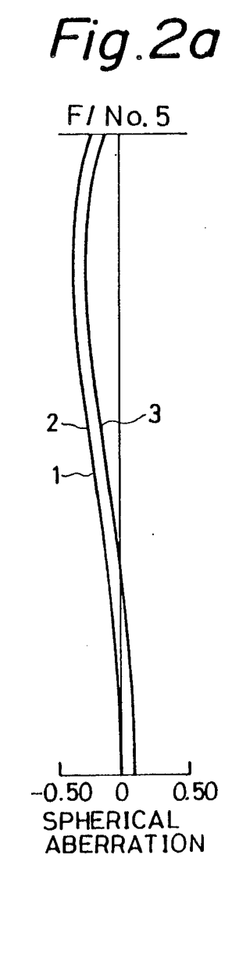
Figure 2B:
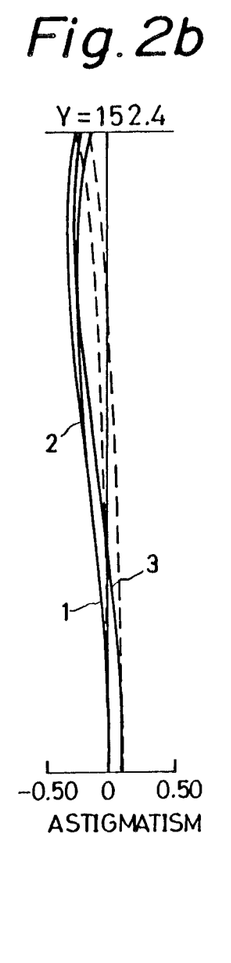
Figures 2C, 2D:
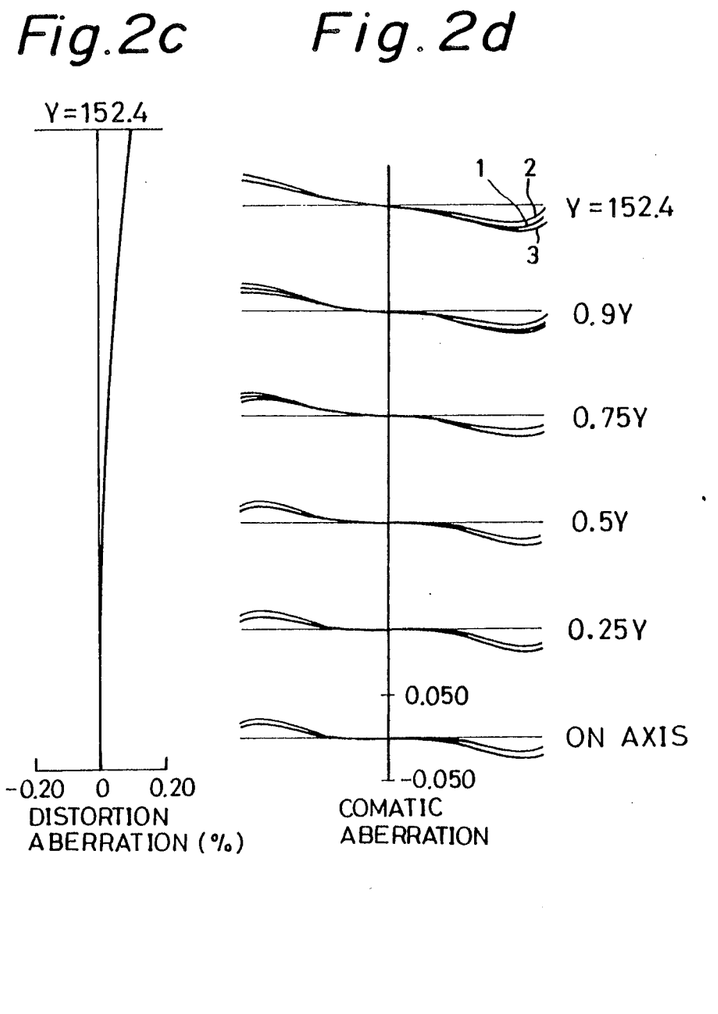
Figure 3A:
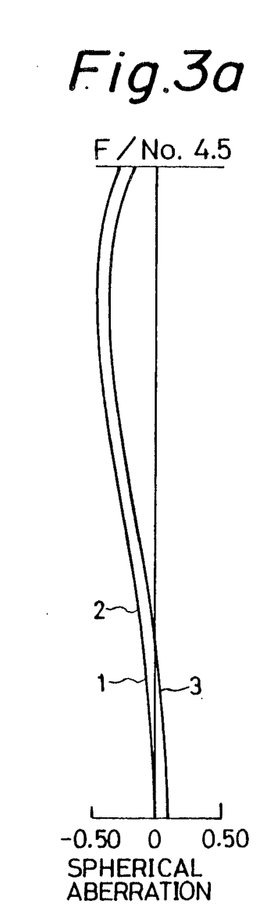
Figure 3B:
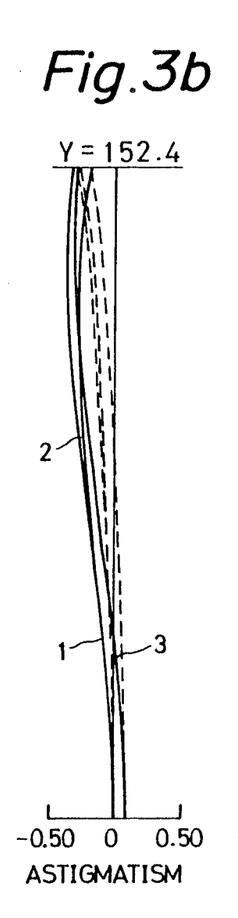
Figures 3C, 3D:
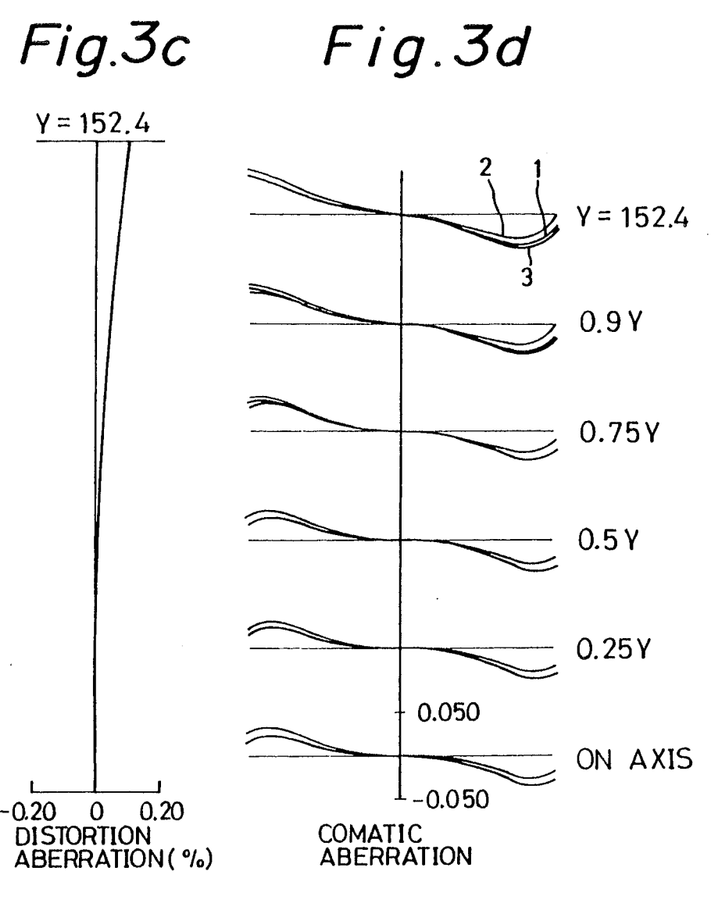
Figure 4A:
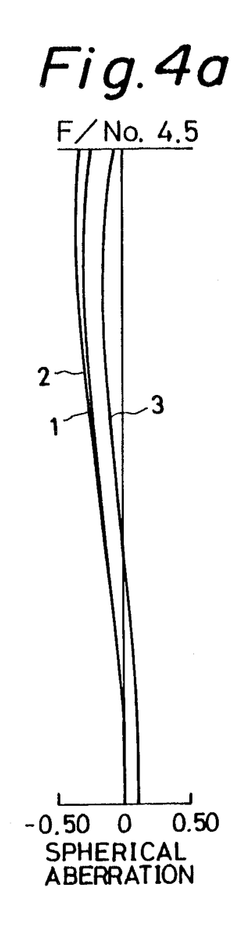
Figure 4B:
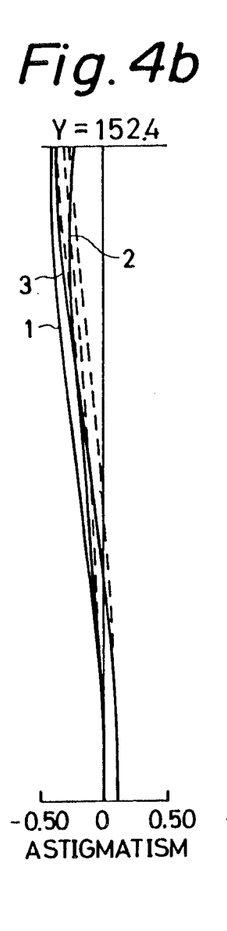
Figure 4C:
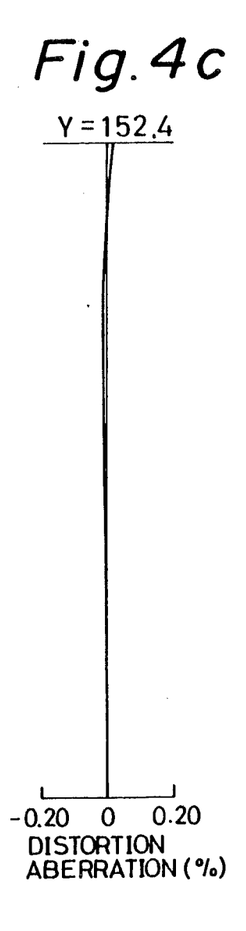
Figure 4D:
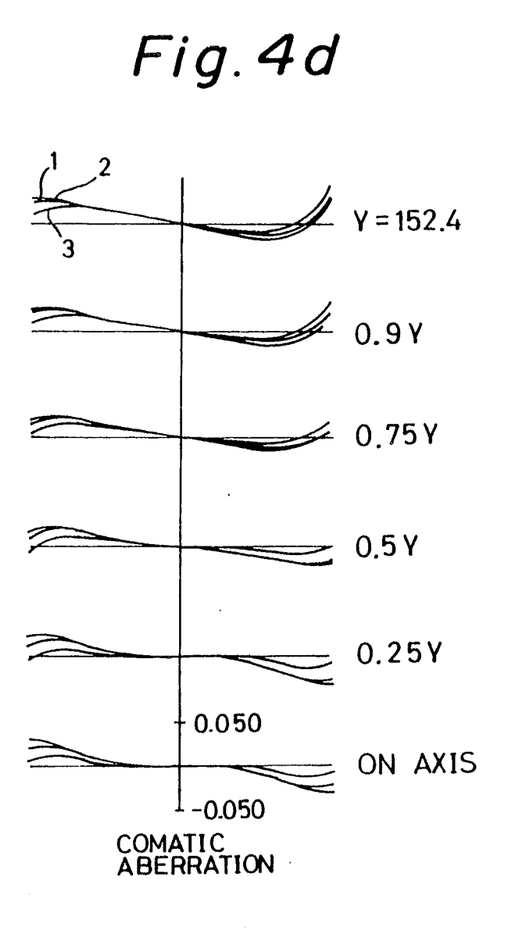
Figure 5A:
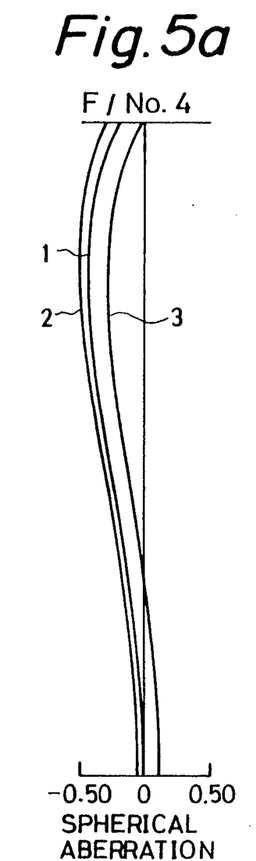
Figure 5B:
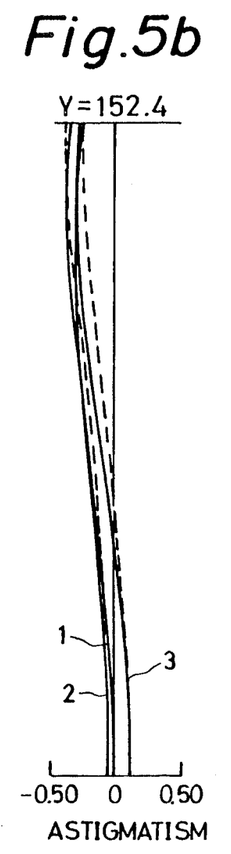
Figure 5C:
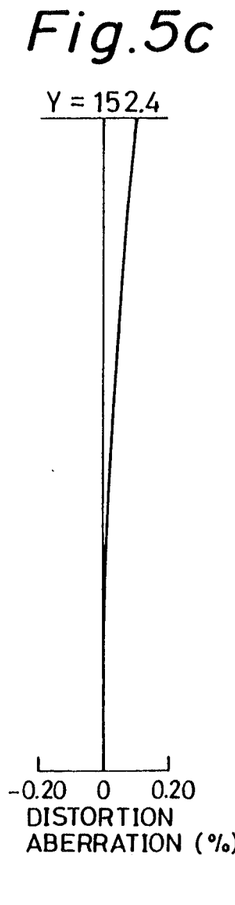
Figure 5D:
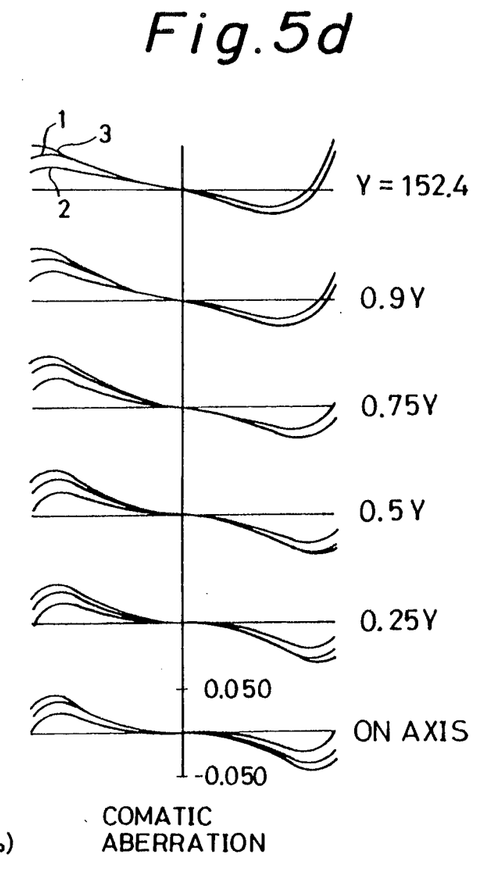
Figure 6A:
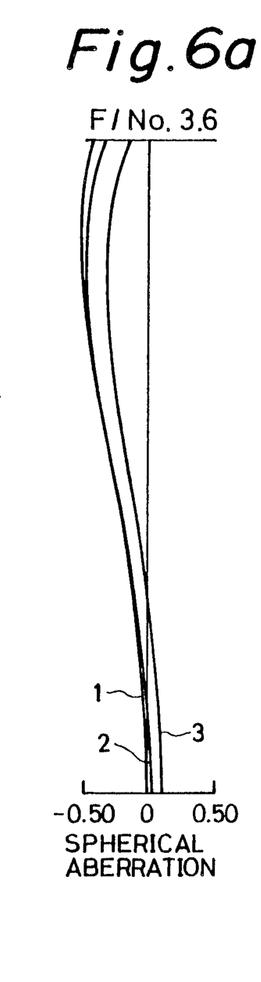
Figure 6B:
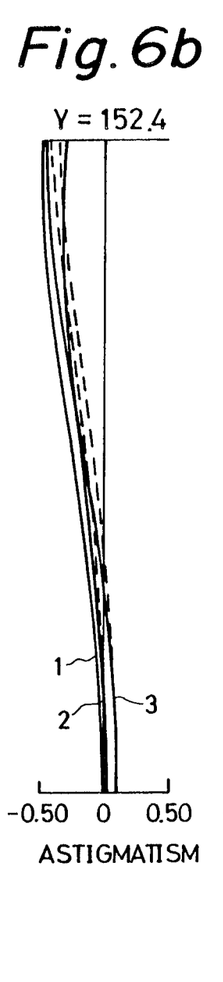
Figure 6C:
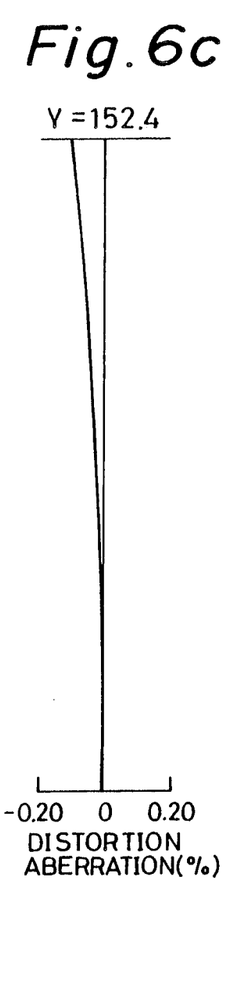
Figure 6D:
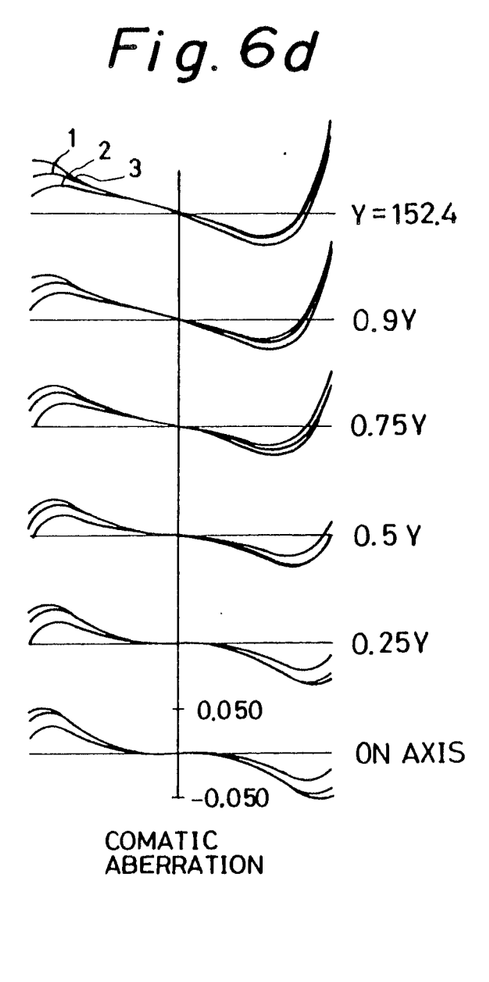
Figure 7A:
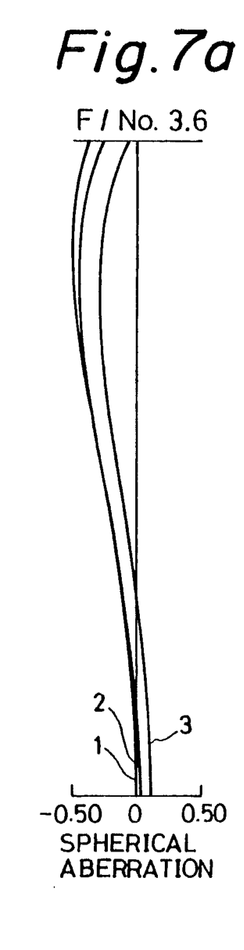
Figure 7B:
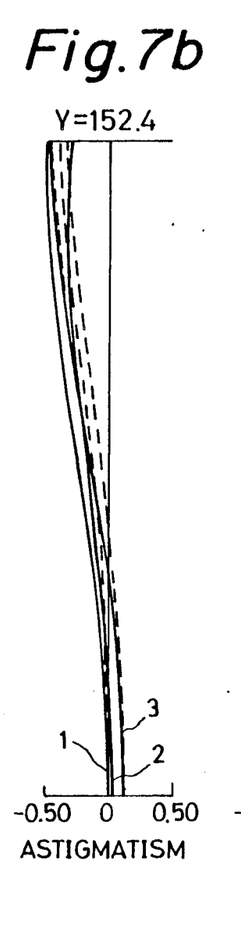
Figure 7C:
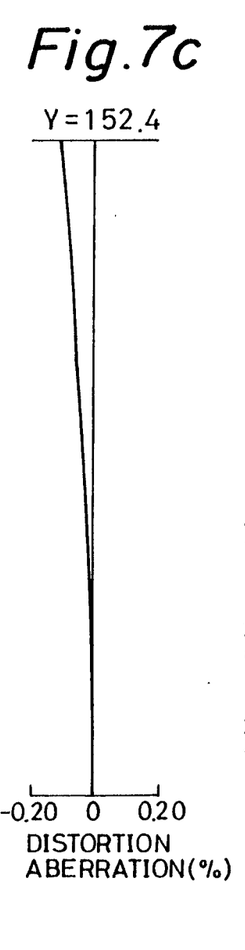
Figure 7D:
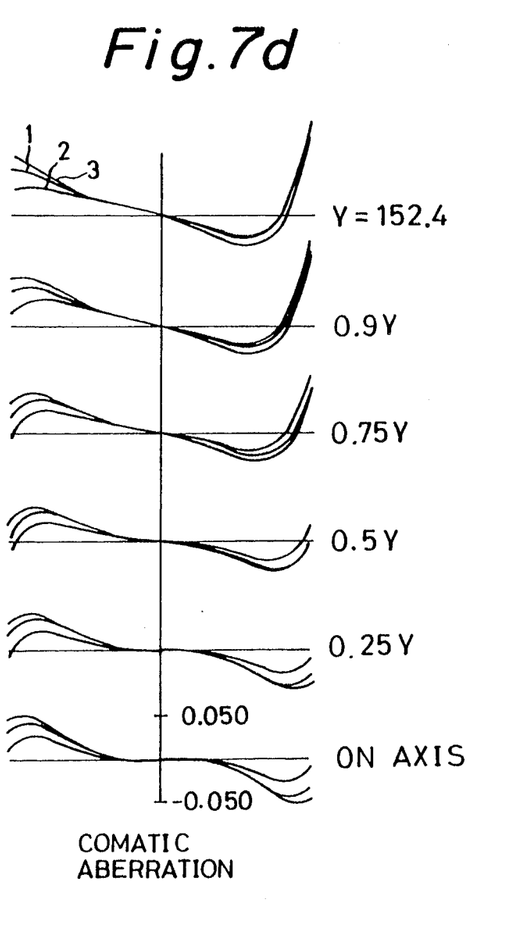

As shown in FIG. 1, the lens for reading an original in each of first and second embodiments of the present invention is constructed such that first to fourth lens groups are sequentially arranged from an object side to an image side. A diaphragm 17 is arranged between the second and third lens groups.

The first lens group is constructed by a joining lens having a positive focal length and composed of a positive lens 10 and a negative lens 12.

The second lens group is constructed by a joining lens having a positive focal length and composed of a negative meniscus lens 14 having a convex face on the object side and a positive meniscus lens 16 having a convex face on the object side.

The third lens group is constructed by a positive meniscus lens 18 having a concave face on the object side.

The fourth lens group is constructed by a joining lens composed of a negative lens 20 and a positive lens 22.

Accordingly, the entire lens system is constructed by the four lens groups composed of seven lenses.

A focal length of the above fourth lens group can be set to be a positive or negative value.

In the lens for reading an original in the first embodiment of the present invention, a partial dispersion ratio $\theta_{gF}$ defined as $(n_g - n_F)/(n_F - n_C)$ using refractive indexes $n_g$, $n_F$ and $n_C$ of a lens material with respect to lines g, F and C, and an Abbe number $\nu_e$ with respect to a line e satisfy the following conditions, $$\nu_e > 65 \quad (1\text{-}I)$$

$$\theta_{gF} < 0.004 \quad (1\text{-}II)$$

with respect to the positive meniscus lenses of the above second and third lens groups.

The lens for reading an original in the second embodiment of the present invention further has the following features in addition to the above lens construction in the first embodiment.

Namely, a focal length f of an entire lens system and a focal length $f_1$ of the first lens group satisfy the following condition.

$$1.6 < f_1/f < 2.9 \quad (2\text{-I})$$

As mentioned above, the lens for reading an original in the present invention is constructed such that the four lens groups are arranged to provide convex, convex, convex and concave refracting powers or convex, convex, convex and convex refracting powers. Further, the above conditions (1-I) and (1-II) are satisfied so that chromatic aberration on an optical axis of the original reading lens is preferably restricted and best focusing faces with respect to red, green and blue light colors are preferably in conformity with each other.

The conditions (1-I) and (1-II) are conditions for prescribing the chromatic aberration on the optical axis of the original reading lens. When condition (1-I) is not satisfied, the chromatic aberration is excessively reduced on the side of a short wavelength so that the chromatic aberrations on the sides of short and long wavelengths are unbalanced. Therefore, the chromatic aberration on the optical axis of the original reading lens is excessively increased so that this chromatic aberration cannot be corrected by other optical parameters.

When condition (1-II) is not satisfied, a secondary spectrum is increased so that no achromatic effect can be obtained.

A field angle and an aperture of the lens for reading an original are increased by satisfying the condition (2-I). This condition (2-I) relates to refracting power of the first lens group. When condition (2-I) is not satisfied with respect to the refracting power of the first lens group, the field angle and the aperture of the original reading lens cannot be increased.

Six concrete Embodiments of the present invention will now be described.

As shown in FIG. 1, reference numeral $r_i$ designates a radius of curvature of an i-th lens face counted from the object side. Reference numeral $d_i$ designates a distance between i-th lens faces. Reference numerals $n_j$ and $\nu_j$ respectively designate a refractive index and an Abbe number with respect to the material of a j-th lens counted from the object side. The respective values of the refractive index and the Abbe number relate to the line e. Reference numeral $F_{NO}$ shows brightness and reference numerals f and $f_1$ respectively designate a focal length of the entire lens system and a focal length of the first lens group. Reference numerals $\omega$ and m respectively designate a half field angle (unit: degree) and magnification.

Further, in the respective concrete Embodiments, respective values with respect to i=12, 13, and j=8 are values relating to cover glass 24 of the solid-state image sensor shown in FIG. 1.

EMBODIMENT 1

$F_{NO} = 5.0$, f = 100, $f_1$ = 184, $f_1/f$ = 1.84
$\omega$ = 19.4, m = 0.2205, $\theta_{KF}$ = 0.0027, 0.0033

| i | $r_i$ | $d_i$ | j | $n_j$ | $\nu_j$ |
|---|---|---|---|---|---|
| 1 | 29.435 | 12.44 | 1 | 1.74435 | 52.4 |
| 2 | −239.780 | 1.28 | 2 | 1.61673 | 43.6 |
| 3 | 24.313 | 0.92 | | | |
| 4 | 36.728 | 1.28 | 3 | 1.48915 | 70.0 |
| 5 | 13.424 | 5.10 | 4 | 1.45720 | 89.8 |
| 6 | 62.766 | 7.65 | | | |
| 7 | −47.246 | 6.72 | 5 | 1.49845 | 81.2 |
| 8 | −21.743 | 0.50 | | | |
| 9 | −18.861 | 3.81 | 6 | 1.61673 | 43.6 |
| 10 | 158.612 | 14.05 | 7 | 1.79196 | 47.1 |
| 11 | −39.995 | 89.85 | | | |
| 12 | ∞ | 1.00 | 8 | 1.51825 | 63.9 |
| 13 | ∞ | | | | |

EMBODIMENT 2

$F_{NO} = 4.5$, f = 100, $f_1$ = 210, $f_1/f$ = 2.10
$\omega$ = 19.4, m = 0.2205, $\theta_{KF}$ = 0.0027, 0.0033

| i | $r_i$ | $d_i$ | j | $n_j$ | $\nu_j$ |
|---|---|---|---|---|---|
| 1 | 30.337 | 13.42 | 1 | 1.74435 | 52.4 |
| 2 | −199.229 | 1.44 | 2 | 1.61673 | 43.6 |
| 3 | 23.973 | 0.94 | | | |
| 4 | 34.145 | 1.28 | 3 | 1.48915 | 70.0 |
| 5 | 14.094 | 5.44 | 4 | 1.45720 | 89.8 |
| 6 | 61.068 | 6.71 | | | |
| 7 | −49.575 | 7.16 | 5 | 1.49845 | 81.2 |
| 8 | −21.931 | 0.51 | | | |
| 9 | −19.177 | 3.96 | 6 | 1.61673 | 43.6 |
| 10 | 137.175 | 15.33 | 7 | 1.79196 | 47.1 |
| 11 | −41.701 | 88.43 | | | |
| 12 | ∞ | 1.00 | 8 | 1.51825 | 63.9 |
| 13 | ∞ | | | | |

EMBODIMENT 3

$F_{NO} = 4.5$, f = 100, $f_1$ = 224, $f_1/f$ = 2.24
$\omega$ = 19.4, m = 0.2205, $\theta_{KF}$ = 0.0033, 0.0033

| i | $r_i$ | $d_i$ | j | $n_j$ | $\nu_j$ |
|---|---|---|---|---|---|
| 1 | 32.649 | 13.28 | 1 | 1.83945 | 42.5 |
| 2 | 80.119 | 4.56 | 2 | 1.65803 | 39.5 |
| 3 | 25.382 | 1.39 | | | |
| 4 | 41.454 | 1.92 | 3 | 1.61673 | 43.6 |
| 5 | 16.008 | 5.84 | 4 | 1.49845 | 81.2 |
| 6 | 104.852 | 10.28 | | | |
| 7 | −65.482 | 3.70 | 5 | 1.49845 | 81.2 |
| 8 | −25.526 | 1.00 | | | |
| 9 | −19.493 | 3.50 | 6 | 1.72538 | 34.5 |
| 10 | −211.659 | 15.33 | 7 | 1.88814 | 40.5 |
| 11 | −32.649 | 89.29 | | | |
| 12 | ∞ | 1.00 | 8 | 1.51825 | 63.9 |
| 13 | ∞ | | | | |

EMBODIMENT 4

$F_{NO} = 4.0$, f = 100, $f_1$ = 237, $f_1/f$ = 2.37
$\omega$ = 19.4, m = 0.2205, $\theta_{KF}$ = 0.0033, 0.0033

| i | $r_i$ | $d_i$ | j | $n_j$ | $\nu_j$ |
|---|---|---|---|---|---|
| 1 | 34.164 | 16.28 | 1 | 1.83945 | 42.5 |
| 2 | 96.506 | 3.03 | 2 | 1.65803 | 39.5 |
| 3 | 25.794 | 1.46 | | | |
| 4 | 40.027 | 1.92 | 3 | 1.61673 | 43.6 |
| 5 | 16.069 | 6.30 | 4 | 1.49845 | 81.2 |
| 6 | 93.487 | 9.29 | | | |
| 7 | −70.292 | 4.14 | 5 | 1.49845 | 81.2 |
| 8 | −26.061 | 1.00 | | | |

-continued

| | $F_{NO} = 4.0$, $f = 100$, $f_1 = 237$, $f_1/f = 2.37$ | | | | |
|---|---|---|---|---|---|
| | $\omega = 19.4$, $m = 0.2205$, $\theta_{KF} = 0.0033, 0.0033$ | | | | |
| i | $r_i$ | $d_i$ | j | $n_j$ | $\nu_j$ |
| 9 | −20.242 | 3.49 | 6 | 1.72538 | 34.5 |
| 10 | −587.561 | 16.60 | 7 | 1.88814 | 40.5 |
| 11 | −34.164 | 88.43 | | | |
| 12 | ∞ | 1.00 | 8 | 1.51825 | 63.9 |
| 13 | ∞ | | | | |

EMBODIMENT 5

| | $F_{NO} = 3.6$, $f = 100$, $f_1 = 286$, $f_1/f = 2.86$ | | | | |
|---|---|---|---|---|---|
| | $\omega = 19.4$, $m = 0.2205$, $\theta_{KF} = 0.0033, 0.0033$ | | | | |
| i | $r_i$ | $d_i$ | j | $n_j$ | $\nu_j$ |
| 1 | 35.333 | 17.88 | 1 | 1.83945 | 42.5 |
| 2 | 119.230 | 2.32 | 2 | 1.65803 | 39.5 |
| 3 | 25.415 | 1.36 | | | |
| 4 | 35.723 | 1.28 | 3 | 1.61673 | 43.6 |
| 5 | 16.131 | 6.92 | 4 | 1.49845 | 81.2 |
| 6 | 73.265 | 8.81 | | | |
| 7 | −78.477 | 4.33 | 5 | 1.49845 | 81.2 |
| 8 | −28.366 | 1.04 | | | |
| 9 | −21.792 | 2.57 | 6 | 1.72538 | 34.5 |
| 10 | 417.165 | 17.88 | 7 | 1.88814 | 40.5 |
| 11 | −35.890 | 87.84 | | | |
| 12 | ∞ | 1.00 | 8 | 1.51825 | 63.9 |
| 13 | ∞ | | | | |

EMBODIMENT 6

| | $F_{NO} = 3.6$, $f = 100$, $f_1 = 263$, $f_1/f = 2.63$ | | | | |
|---|---|---|---|---|---|
| | $\omega = 19.4$, $m = 0.2205$, $\theta_{KF} = 0.0033, 0.0033$ | | | | |
| i | $r_i$ | $d_i$ | j | $n_j$ | $\nu_j$ |
| 1 | 35.626 | 17.52 | 1 | 1.83945 | 42.5 |
| 2 | 122.127 | 2.94 | 2 | 1.65803 | 39.5 |
| 3 | 26.029 | 1.48 | | | |
| 4 | 38.069 | 1.92 | 3 | 1.61673 | 43.6 |
| 5 | 16.185 | 7.03 | 4 | 1.49845 | 81.2 |
| 6 | 82.314 | 8.23 | | | |
| 7 | −74.796 | 4.56 | 5 | 1.49845 | 81.2 |
| 8 | −26.797 | 1.00 | | | |
| 9 | −21.034 | 3.06 | 6 | 1.72538 | 34.5 |
| 10 | 1109.665 | 17.88 | 7 | 1.88814 | 40.5 |
| 11 | −35.408 | 87.81 | | | |
| 12 | ∞ | 1.00 | 8 | 1.51825 | 63.9 |
| 13 | ∞ | | | | |

FIGS. 2a, 2b, 2c, 2d are diagrams of spherical aberration, astigmatism, distortion aberration and comatic aberration with respect to the concrete Embodiment 1 of the present invention. Similarly, FIGS. 3a, 3b, 3c, 3d to 7a, 7b, 7c, 7d are diagrams of spherical aberration, astigmatism, distortion aberration and comatic aberration with respect to the respective concrete Embodiments 2 to 6 of the present invention. In the respective diagrams, reference numerals ①, ② and ③ respectively relate to lines e, g, C. In the diagrams of the spherical aberration, a curve representing a sine condition and a curve representing the spherical aberration of the line e overlap each other. In the diagrams of the astigmatism, solid and broken lines respectively show radial and tangential directions.

In the respective Embodiments, the above aberrations are preferably corrected and the chromatic aberration on the optical axis of the original reading lens is preferably especially restricted.

As mentioned above, in accordance with the above construction of the lens for reading an original in the present invention, when a color original is especially read, a suitable reading operation can be performed even when an original image of each of decomposed colors composed of red, green and blue with respect to the color original is read on the same plane.

Many widely different embodiments of the present invention may be constructed without departing from the spirit and scope of the present invention. It should be understood that the present invention is not limited to the specific embodiments described in the specification, except as defined in the appended claims.

What is claimed is:

1. A lens for reading an original at a reduced magnification, comprising:

first to fourth lens groups sequentially arranged from an object side toward an image side; and a diaphragm arranged between the second and third lens groups;

the first lens group being constructed by a joining lens having a positive focal length and comprising positive and negative lenses;

the second lens group being constructed by a joining lens having a positive focal length and comprising a negative meniscus lens having a convex face on the object side and a positive meniscus lens having a convex face on the object side;

the third lens group being constructed by a positive meniscus lens having a concave face on the object side;

the fourth lens group being constructed by a joining lens comprising negative and positive lenses; and a partial dispersion ratio $\theta_{gF}$ defined as $(n_g - n_F)/(n_F - n_C)$ using refractive indexes $n_g$, $n_F$ and $n_C$ of a lens material with respect to lines g, F and C, and an Abbe number $\nu_e$ with respect to a line e satisfying the following conditions, $$\nu_e > 65 \qquad \text{(1-I)}$$

$$\theta_{gF} < 0.004 \qquad \text{(1-II)}$$

with respect to the positive meniscus lenses of said second and third lens groups.

2. A lens for reading an original as claimed in claim 1, wherein a focal length f of an entire lens system and a focal length $f_1$ of the first lens group satisfy the following condition, $$1.6 < f_1/f < 2.9 \qquad \text{(2-I)}.$$

* * * * *